(12) United States Patent
Biskeborn et al.

(10) Patent No.: US 10,902,868 B2
(45) Date of Patent: Jan. 26, 2021

(54) TAPE HEAD MODULE HAVING RECESSED PORTION TO PROVIDE AN AIR BEARING BETWEEN A TAPE MEDIUM AND A TAPE BEARING SURFACE OF THE MODULE

(71) Applicant: INTERNATIONAL BUSINESS MACHINES CORPORATION, Armonk, NY (US)

(72) Inventors: Robert G. Biskeborn, Hollister, CA (US); Calvin S. Lo, Saratoga, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/581,604

(22) Filed: Sep. 24, 2019

(65) Prior Publication Data
US 2020/0020354 A1 Jan. 16, 2020

Related U.S. Application Data

(63) Continuation of application No. 15/924,109, filed on Mar. 16, 2018, now Pat. No. 10,490,211.

(51) Int. Cl.
*G11B 5/187* (2006.01)
*G11B 5/008* (2006.01)
*G11B 5/29* (2006.01)

(52) U.S. Cl.
CPC ........ *G11B 5/1871* (2013.01); *G11B 5/00813* (2013.01); *G11B 5/29* (2013.01)

(58) Field of Classification Search
CPC .................. G11B 5/1871; G11B 5/29

USPC ................................ 360/121, 122, 316
See application file for complete search history.

(56) References Cited

U.S. PATENT DOCUMENTS

| | | | |
|---|---|---|---|
| 3,872,507 A | 3/1975 | Sano et al. | |
| 5,224,641 A | 7/1993 | Spicer | |
| 5,307,227 A * | 4/1994 | Okada | G11B 15/62 360/122 |
| 5,774,306 A | 6/1998 | Wang et al. | |
| 5,969,912 A | 10/1999 | Cope | |
| 6,122,147 A | 9/2000 | Fahimi et al. | |
| 6,282,055 B1 | 8/2001 | Lakshmikumaran et al. | |
| 6,433,959 B1 | 8/2002 | Lakshmikumaran et al. | |

(Continued)

OTHER PUBLICATIONS

Albrecht et al., "Magnetic Tape Head," IP.com, IPCOM000055057D, May 1980, pp. 2.

(Continued)

*Primary Examiner* — Jefferson A Evans
(74) *Attorney, Agent, or Firm* — Alan S. Raynes; Konrad Raynes Davda & Victor LLP (57) ABSTRACT

Provided are a tape head module, tape drive, and method for moving a tape medium over a tape head having a recessed portion to provide air bearing between a tape medium and a tape bearing surface of the module. The tape head includes a tape bearing surface, an array of transducers, including read and/or write transducers, on the tape bearing surface, and a recessed portion formed on the tape bearing surface, wherein the array of transducers is located on the tape bearing surface between the recessed portion and an end of the module to perform read and/or write operations with respect to the tape medium.

20 Claims, 7 Drawing Sheets

(56) References Cited

U.S. PATENT DOCUMENTS

| | | | |
|---|---|---|---|
| 6,690,542 B1 * | 2/2004 | Wang | G11B 5/115 360/129 |
| 7,154,691 B2 | 12/2006 | Girvin et al. | |
| 7,271,983 B2 | 9/2007 | Saliba | |
| 8,054,579 B2 | 11/2011 | Biskeborn | |
| 8,542,460 B2 | 9/2013 | Biskeborn et al. | |
| 8,917,476 B2 * | 12/2014 | Holmberg | G11B 5/00813 360/90 |
| 8,958,175 B1 | 2/2015 | Lakshmikumaran et al. | |
| 9,280,988 B1 | 3/2016 | Lakshmikumaran et al. | |
| 2004/0228029 A1 | 11/2004 | Saliba | |
| 2007/0183091 A1 | 8/2007 | Saliba | |
| 2008/0024913 A1 | 1/2008 | Dugas | |
| 2009/0135520 A1 | 5/2009 | Hachisuka | |
| 2010/0073816 A1 | 3/2010 | Komori et al. | |
| 2012/0008234 A1 | 1/2012 | Biskeborn et al. | |

OTHER PUBLICATIONS

What is Ion Milling, AJA International Inc.
U.S. Appl. No. 15/924,109, filed Mar. 16, 2018.
Office Action dated Jan. 11, 2019, pp. 14, for U.S. Appl. No. 15/924,109, filed Mar. 16, 2018.
Response dated Apr. 11, 2019, pp. 11, to Office Action dated Jan. 11, 2019, pp. 14, for U.S. Appl. No. 15/924,109, filed Mar. 16, 2018.
Notice of Allowance dated Jul. 26, 2019, pp. 9, for U.S. Appl. No. 15/924,109.
U.S. Appl. No. 15/968,144, filed May 1, 2018.
List of IBM Patents or Patent Applications Treated as Related, pp. 2.
Office Action dated Jul. 21, 2020, pp. 17, for U.S. Appl. No. 15/968,144.
Response dated Oct. 21, 2020, pp. 9, to Office Action dated Jul. 21, 2020, pp. 17, for U.S. Appl. No. 15/968,144.

* cited by examiner

FIG. 8

TAPE HEAD MODULE HAVING RECESSED PORTION TO PROVIDE AN AIR BEARING BETWEEN A TAPE MEDIUM AND A TAPE BEARING SURFACE OF THE MODULE

BACKGROUND OF THE INVENTION

1. Field of the Invention

Provided are a tape head module, tape drive, and method for moving a tape medium over a tape head having a recessed portion to provide air bearing between a tape medium and a tape bearing surface of the module.

2. Description of the Related Art

In magnetic storage systems, data is read from and written onto magnetic recording media utilizing magnetic read and write transducers. Data is written on the magnetic recording media by moving a magnetic recording transducer to a position over the media where the data is to be stored. The magnetic recording transducer generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, the goal is to increase track density on the recording tape medium while decreasing the thickness of the magnetic tape medium. In a tape drive system, magnetic tape is moved over the surface of the tape head at high speed. This movement tends to cause formation of a film of air between the head and tape. Usually the tape head is designed to minimize the spacing between the head and the tape. The spacing between the magnetic head and the magnetic tape is crucial so that the recording gaps of the transducers, which are the source of the magnetic recording flux, are close to the tape to effect efficient signal transfer, and so that the read element is close to the tape to provide effective coupling of the magnetic field from the tape to the read element.

However, this close spacing of the tape medium and the tape bearing surface results in various tribological issues becoming more pronounced, among them, tape/head stiction and running friction. Particularly, as the linear density of magnetic tape recording increases, the magnetic spacing must be reduced, requiring smoother heads and tapes. These may be associated with increased startup friction (stiction), increased running friction, and more instantaneous speed variations (ISVs). In addition, tape-head wear may limit tape lifetime, and contact-generated debris can adhere to the head, increasing the magnetic spacing.

There is a need in the art for reducing friction when the tape medium travels across the tape head while ensuring the region of the tape that is subject to read and write operations at the transducer elements comes into contact with the transducer elements to ensure accurate read and write operations to bands of the tape medium.

SUMMARY

Provided are a tape head module, tape drive, and method for moving a tape medium over a tape head having a recessed portion to provide air bearing between a tape medium and a tape bearing surface of the module. The tape head includes a tape bearing surface, an array of transducers, including read and/or write transducers, on the tape bearing surface, and a recessed portion formed on the tape bearing surface, wherein the array of transducers is located on the tape bearing surface between the recessed portion and an end of the module to perform read and/or write operations with respect to the tape medium.

DETAILED DESCRIPTION

Described embodiments provide improvements to tape head technology to reduce friction between the tape bearing surface and the magnetic tape medium. Future tape medium may have smoother surfaces to reduce spacing between the tape head and tape medium. Low spacing between the tape head and tape medium is needed to improve areal density and cartridge capacity. Currently, friction is reduced by reducing the tape bearing surface area and by contouring the non-functional portions of the tape head bearing surface, i.e., those portions not including the transducer elements, by using a diamond lapping device to bevel the surface. The beveling may remove material from the edges of the module to create air bearing.

Described embodiments provide improvements to the tape head module to reduce friction by vacuum processing recessed portions in the tape bearing surface to cause an air bearing to form between the head and tape in the non-functional regions of the tape bearing surface, those regions not including the transducer read and write elements. This arrangement reduces function and may be manufactured with batch processes, providing faster throughput and lower costs of manufacturing the head. Further, forming the recessed portions within the area of the tape bearing surface retains the skiving edges of the module which is useful for removing debris from the tape medium surface contacting the skiving edges.

Figure 1:
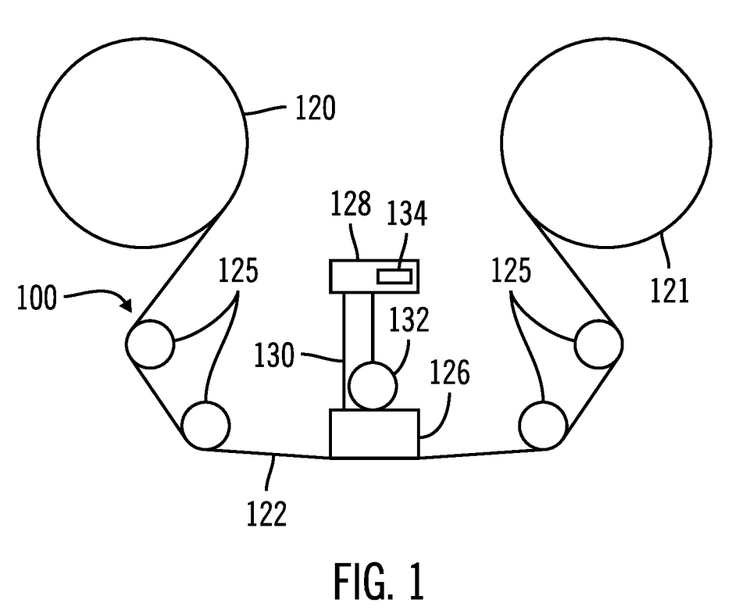
FIG. 1 illustrates an embodiment of a tape drive system in which embodiments are implemented.

FIG. 1 illustrates an embodiment of a tape drive 100 of a tape-based data storage system. A tape supply cartridge 120 and a take-up reel 121 are provided to support a tape 122. One or more of the reels may form part of a removable cassette and are not necessarily part of the system 100. The tape drive 100 may further include drive motor(s) to drive the tape supply cartridge 120 and the take-up reel 121 to move the tape 122 over a tape head 126 of any type. Guides 125 guide the tape 122 across the tape head 126. Such tape head 126 is in turn coupled to a controller assembly 128 via a cable 130. The controller assembly 128 typically controls head functions such as servo following, writing, reading, etc. The cable 130 may include read/write circuits to transmit data to the head 126 to be recorded on the tape 122 and to receive data read by the head 126, which is described below, from the tape 122. An actuator 132 controls position of the head 126 relative to the tape 122.

An interface may also be provided for communication between the tape drive and a host (integral or external) to send and receive the data and for controlling the operation of the tape drive and communicating the status of the tape drive to the host, all as will be understood by those of skill in the art.

Figure 2:
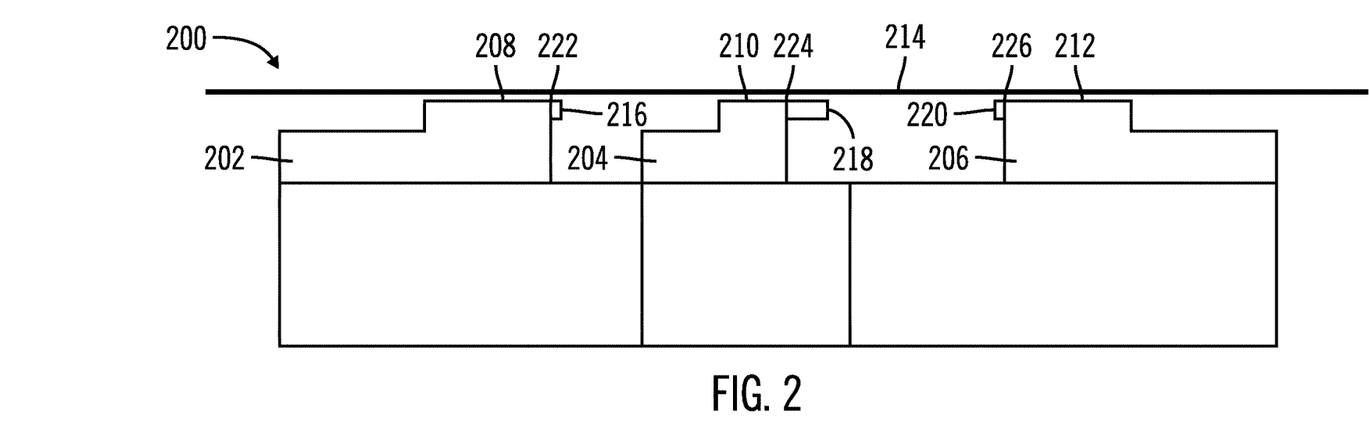
FIG. 2 illustrates an embodiment of a tape head.

FIG. 2 illustrates an embodiment of a magnetic head 200 according to one embodiment of the present invention that includes a first 202, second 204, and third 206 modules each having a flat profile tape bearing surface 208, 210, 212 respectively. During operation, a layer of air will introduced between a tape medium 214 and a portion of the tape bearing surfaces 208, 201, 212, referred to as an air bearing, to avoid friction between the tape medium 214 and the tape bearing surfaces 208, 210, 212. A portion of the tape will contact the tape bearing surfaces 208, 210, 212 at the location of the read and write elements, and other portions of the tape medium 214 will ride above the tape bearing surface on a layer of air, sometimes referred to as an "air bearing". The first module 202 may comprise a "leading" module as it is the first module encountered by the tape in a three module design for tape. The third module 206 may be referred to as a "trailing" module. The trailing module follows the middle module 204 and is the last module seen by the tape in a three module design. The leading and trailing modules 202, 206 are referred to collectively as outer modules. The outer modules 202, 206 may alternate as leading modules, depending on the direction of travel of the tape 214.

In one embodiment, the tape bearing surfaces 208, 210, 212 of the first, second and third modules 202, 204, 206, respectively, lie on parallel planes such that the tape bearing surfaces 208, 210, 212 are flush with each other on a same plane.

During operations, only a portion of the tape 214 is in contact with the tape bearing surface 208, 210, 212, constantly or intermittently, and other portions of the tape ride above the tape bearing surface on a layer of air, sometimes referred to as an "air bearing". In described embodiments, the tape 214 is in contact with the tape bearing surface 208, 210, 212 in functional regions including the read, write and/or servo transducers and will be separated from the tape bearing surface 208, 210, 212 in non-functional areas of the tape bearing surface 208, 210, 212 not including the transducers.

In the embodiment of FIG. 2, the first 202, second 204, and third 206 modules may each have a closure 216, 218, 220, respectively, which extends the tape bearing surface of the associated module to position the read/write elements away from the edge of the tape bearing surfaces. The closure 218 on the second module 204 can be a ceramic closure of a type typically found on tape heads. The closures 216, 220 of the first 202 and third 206 modules may be shorter than the closure 218 of the second module 204 as measured parallel to a direction of tape travel over the respective module. This enables setting the modules closer together.

In certain embodiments, the transducer array of readers, writers and servo readers may be located on an edge 222, 224, 226 of the module 202, 204, 206 between the closures 216, 220, 220.

Figure 3:
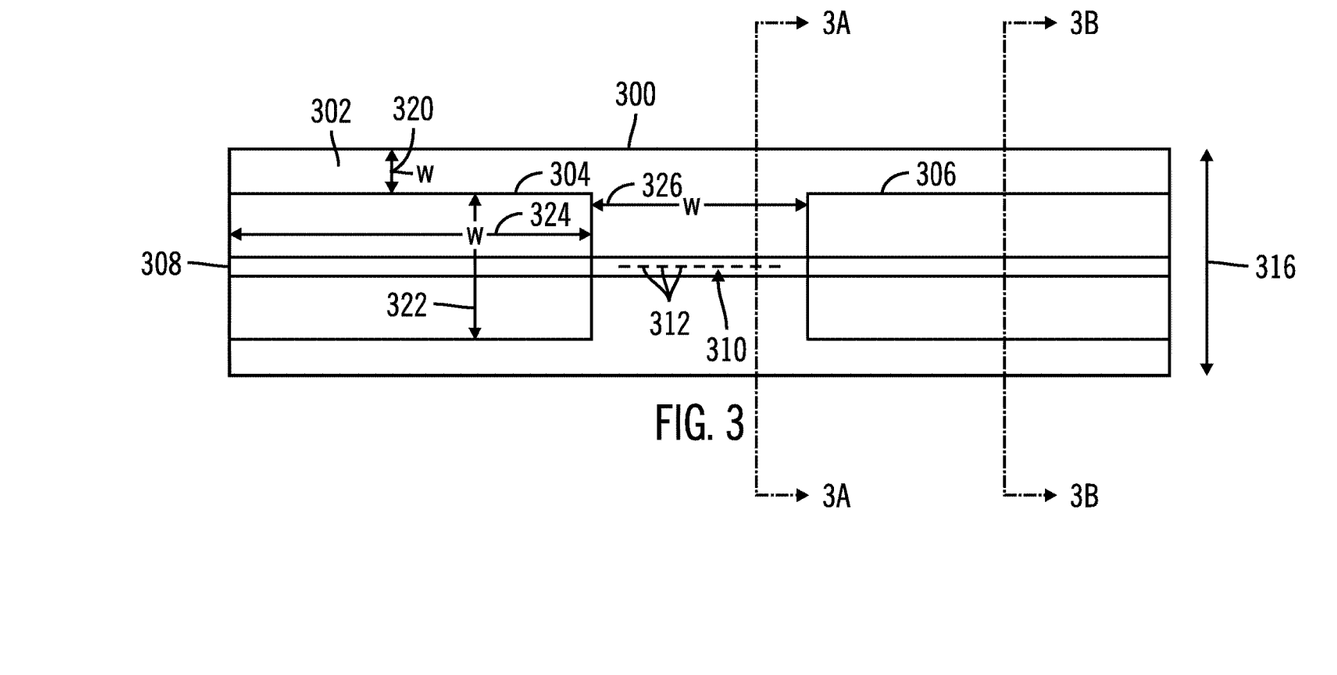
FIG. 3 illustrates an embodiment of a top plan view of a module of the tape head.

FIG. 3 illustrates a top plan view of an embodiment of a module 300, such as one of the modules 202, 204, 206, having a tape bearing surface 302 with a first recessed portion 304 and second recessed portion 306 formed in the tape bearing surface 300. The module 300 has a gap 308 formed in an electrically conductive substrate extending the length of the module 300 and a transducer array section 310 including read, write, and/or server transducers 312. The transducer array section 310 is on the tape bearing surface 302 between the recessed portions 304 and 306. The tape medium 314 (shown in FIG. 4) moves across the module 300 in a forward or reverse direction indicated by the arrow 316.

One or more of the modules 202, 204, and 206 may include the recessed portions 304, 306 to cause the air bearing. In certain embodiments, all the modules 202, 204, 206 may include the recessed portions 304, 306. Further, a tape head can include multiple instances of the module 300, as shown in FIG. 2.

Figure 3A:
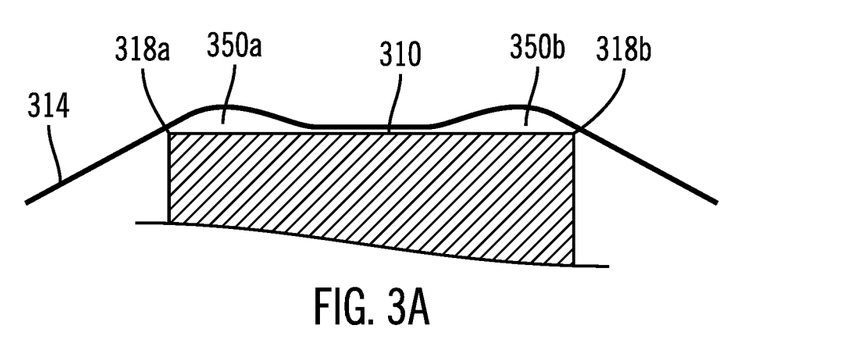
FIGS. 3a and 3b illustrate cross sectional views of the module taken along a plane as shown in FIG. 3
Figure 3B:
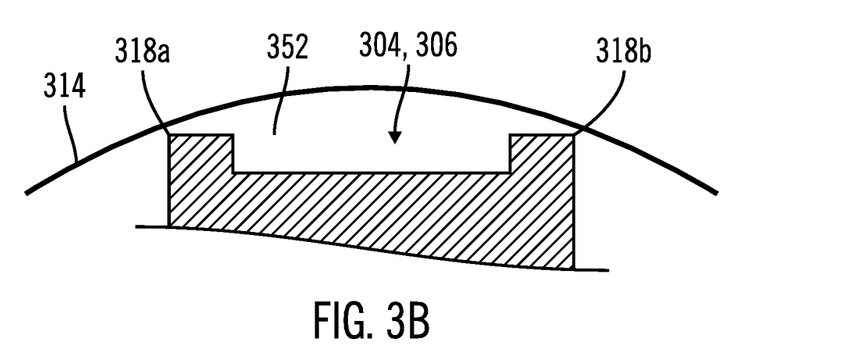

By way of example, in certain implementation, a closure width 320 between an edge of the module 300 and the edge of recessed portion 304, 306, and may be from 15 to 70 microns (μm). The width 322 of the recessed portions 304, 306 may approximately be 100 μm wide and the length 324 may approximately be 5 to 10 millimeters (mm). The depth of the recessed portions 304, 306 may approximately be from 5 to 500 μm. The distance 326 between the recessed portions 304 and 306 may be approximately 2 to 8 mm. In alternative embodiments, different dimensions for these sections may be used FIGS. 3*a* and 3*b* show a cross-section taken along the lines 3*a* and 3*b* in FIG. 3, respectively. FIG. 3*a* shows the cross-section in the transducer array section 310 and shows the tape 314 passing over the transducer array section 310 that comes into contact with the transducers 312 as a result of a vacuum in the transducer array section 310. A spacing of air bearing 350*a*, 350*b* is formed where the tape traverses across the edges 318*a*, 318*b* of the module 300.

FIG. 3*b* shows a cross section in a recessed portion 304, 306, and shows that while the tape 314 is passing over the recessed portions 304, 306, air flows into the recessed portions 304, 306 that forms a spacing of air 352 between the tape 314 and the tape bearing surface 302 in the area of the recessed portions 304, 306. The spacing of air 352 is formed as a result of the air bearing formed by air flowing into the recessed portions 304, 306. In this way, friction is eliminated along most parts of the tape bearing surface 302 except the region of the transducer array section 310.

FIGS. 3*a* and 3*b* show tape bearing surface 302 has sharp skiving edges 318*a*, 318*b*. The tape 314 comes into contact with the skiving edges 318*a*, 318*b*, which scrapes debris off the tape 314 surface as the tape 314 passes over the edges 318*a*, 318*b*. Removing debris from the tape 314 surface avoids introduction of errors during read and write operations from debris on the tape 314 surface. Further, when the tape 314 comes into contact with the skiving edges 318*a*, 318*b*, a space is formed 350*a*, 350*b*, 352, which creates an air bearing and space along most of the tape bearing surface 302, including the area over and adjacent to the recessed portions 304, 306. This space 350*a*, 350*b*, 352, eliminates friction over most of the tape bearing surface 302, except at the area of the transducer array section 310 where atmospheric pressure pushes the tape 314 into contact with the tape bearing surface 302 to allow the elements in the transducer array 312 to contact the tape 314 to perform read and write operations with respect to the tape 314 medium.

Figure 4:
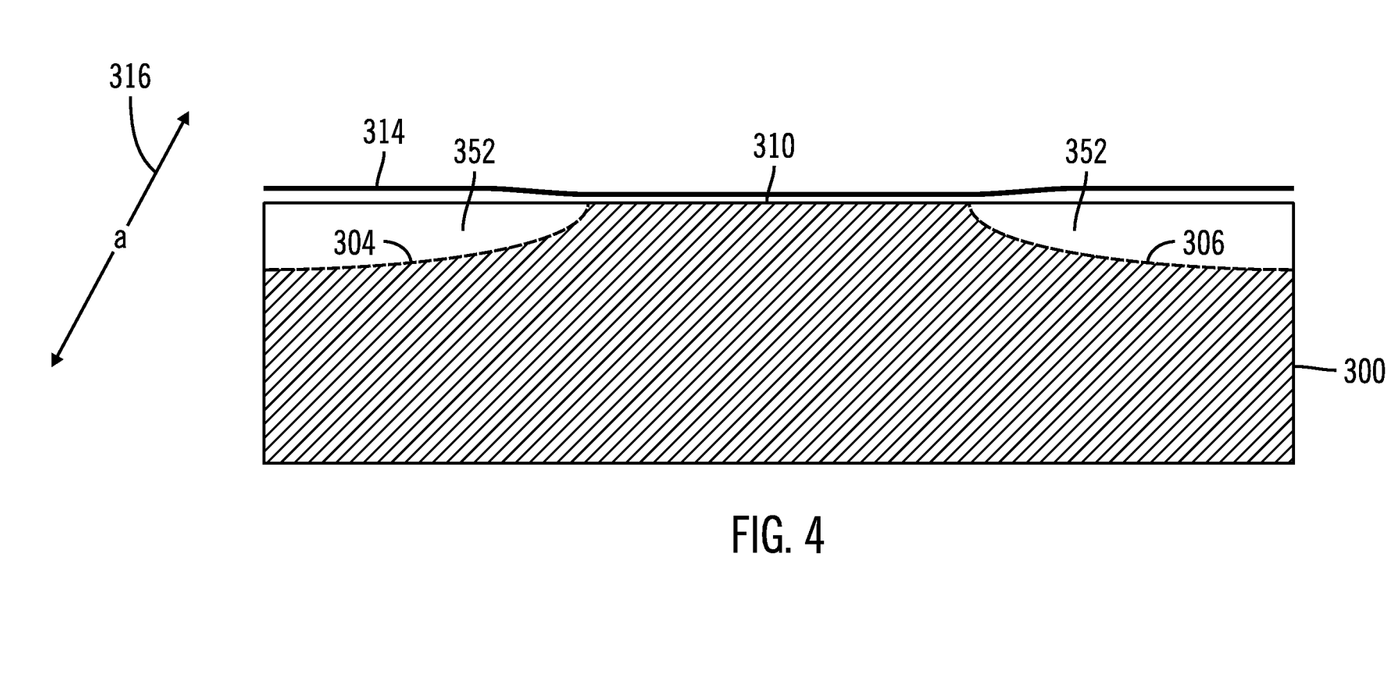
FIG. 4 illustrates a cross sectional view of the module taken along a plane as shown in FIG. 5.
Figure 5:
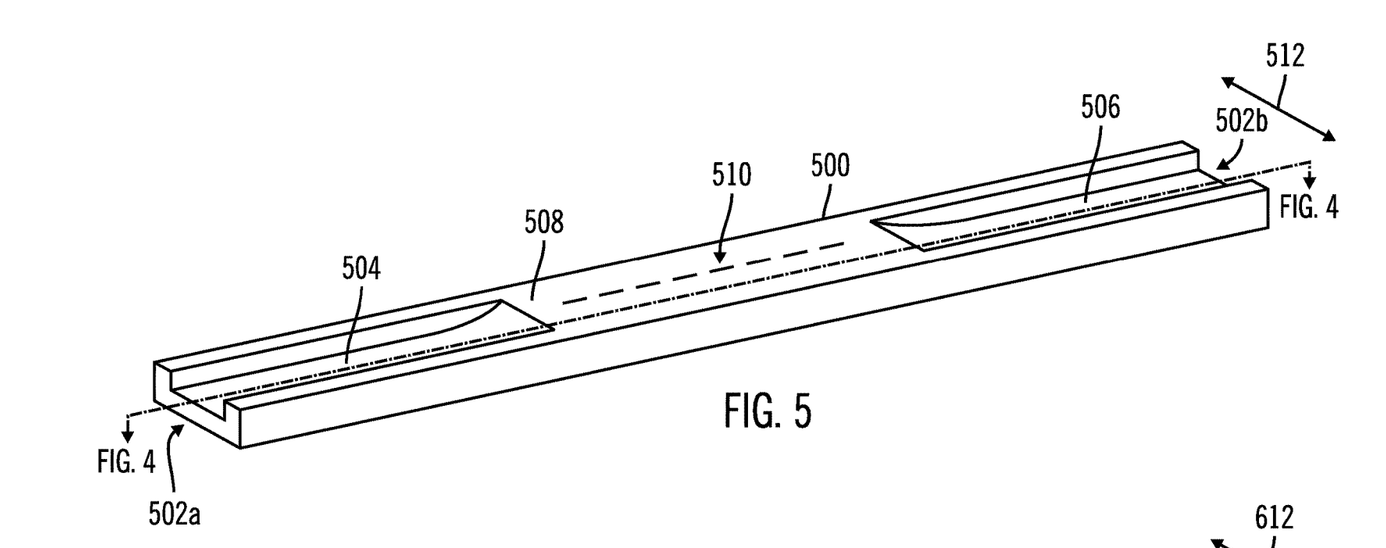
FIGS. 5-7 illustrate embodiments of a module of the tape head.

FIG. 4 illustrates a cross section of the module 300 of FIG. 3, taken along the horizontal length of the module 500 along a cross section shown in FIG. 5, showing how the tape 314 passes over the module 500 with an air bearing 352 between the tape while the tape 314 passes over the recessed portions 304, 306, also shown in FIG. 3b. The tape 314 passes over the module 300 in the directions 316. A vacuum causes the tape 314 to contact the transducer array section 310 to allow the elements in the transducer array section 310, as shown in FIG. 3a, to transfer signals with the tape medium 314 to perform read, write, and/or servo operations with respect to the tape 314 medium. Servo readers are used to position the head during read and write operations.

Figure 6:
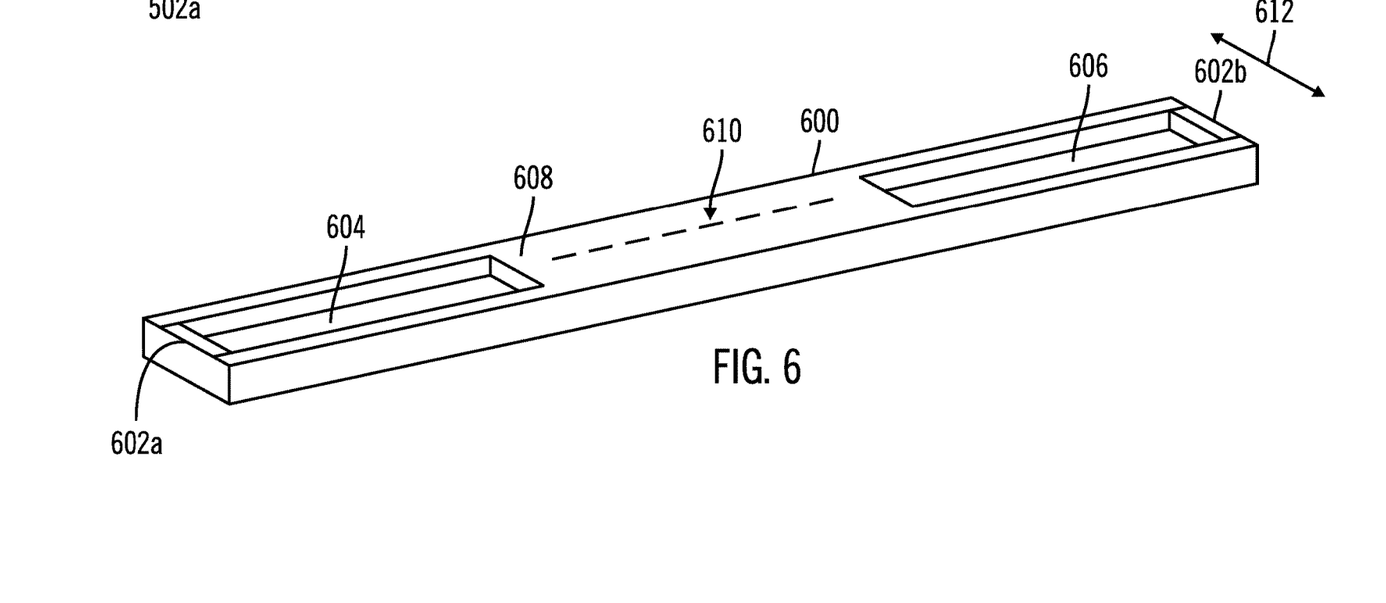
Figure 7:
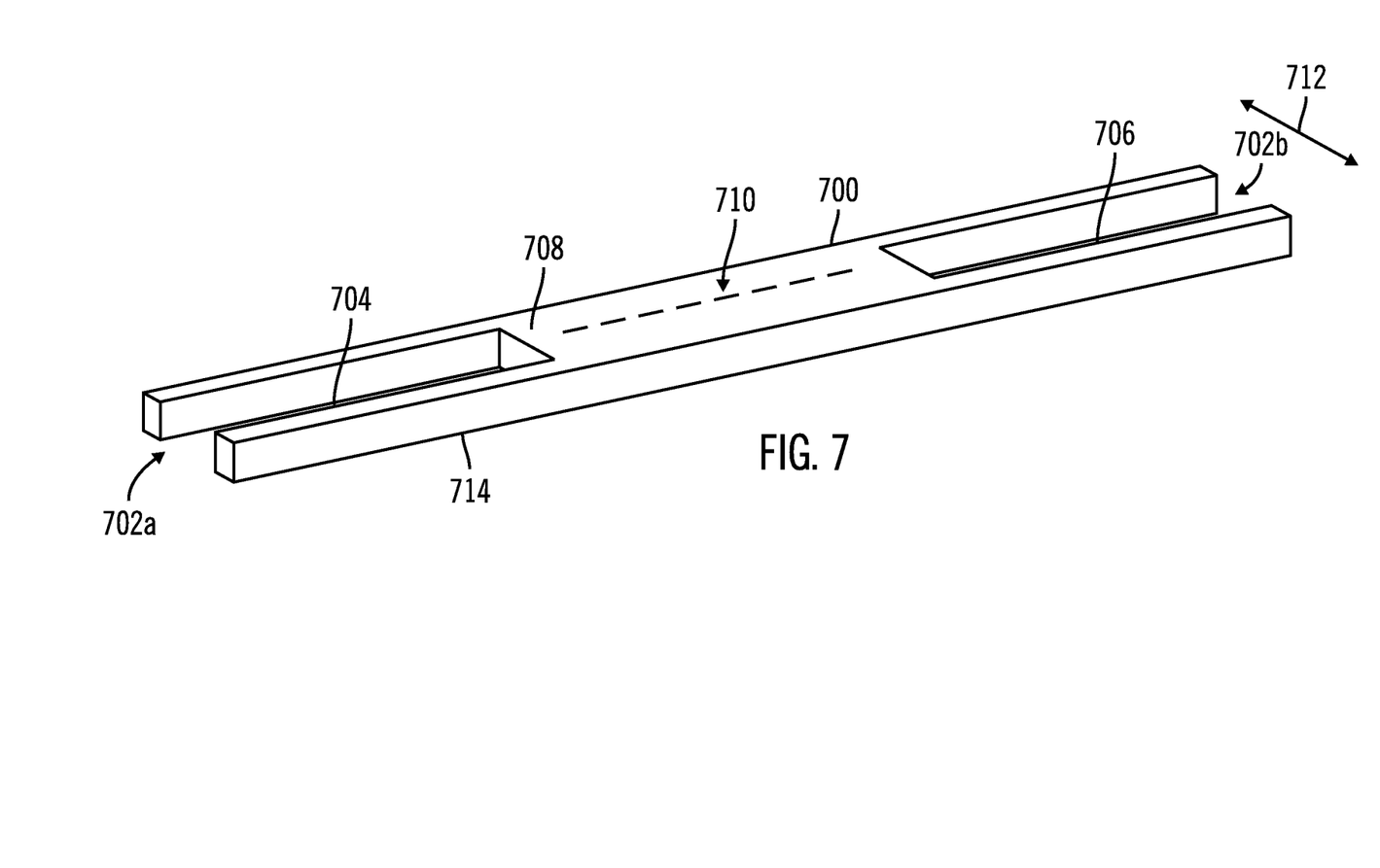

FIGS. 5-7 illustrate different embodiments of the module 300 of FIG. 3 having different arrangements for the recessed portions. FIG. 5 shows the module 500 having open sides 502a, 502b in the recessed portions 504, 506 that allow air to flow directly into the recessed portions 504, 506 while the tape 314 is traversing over a tape bearing surface 508 in the directions 512. The transducer array section 510 includes read, write and/or servo elements to perform read and write operations with respect to the tape medium 314 moving across the module 500 in the directions 512. In FIG. 5, the ends of the recessed portions 504, 506 near the transducer array section 510 curve upward.

FIG. 6 shows the module 600 having side walls 602a, 602b of the recessed portions 604, 606. The transducer array section 610 includes read, write and/or servo elements to perform read and write operations with respect to the tape medium 314 moving across the tape bearing surface 608. Air would flow into the recessed portions 604, 606 through an area where the tape 314 scrapes off the edges 318a, 318b, such as the space 320 shown in FIG. 4. Further, air may flow into a recessed portion 604, 606 if the entire width of the tape does not extend over the entire recessed portion 604, 606 leaving an opening to the recessed portion 604, 606. This air flow into the recessed portions 604, 606 allows an air bearing and space 352 (FIG. 4) to form between the tape 314 and tape bearing surface 602 along most of the length of the tape bearing surface 602. In FIG. 6, the ends of the recessed portions 605, 606 near the transducer array section 610 form a wall orthogonal with respect to the bottom of the recessed portions 604, 606.

In the embodiment of FIG. 6, the tape may operate by not having the tape traverse over the walls 602a, 602b, so that there is always a space between an edge of the tape traversing across the module 600 in the direction 612 and each of the walls 602a, 602b.

FIG. 7 shows the module 700 having open sides 702a, 702b and recessed portions 704, 706 that comprise openings extending from the tape bearing surface 708 to an opposite side 714 of the module 700. The openings 704, 706 allow air to flow directly into the recessed portions 704, 706 from both sides 702a, 702b of the module 700 while the tape 314 is traversing over the tape bearing surface 702 in the directions 712. The transducer array section 710 includes read, write and/or servo elements to perform read and write operations with respect to the tape medium 314 moving across the module 700 in the directions 712.

FIGS. 5-7 show first and second recessed portions symmetrically disposed on the module. In alternative embodiments, there may be only one recessed portion or three or more recessed portions.

Figure 8:
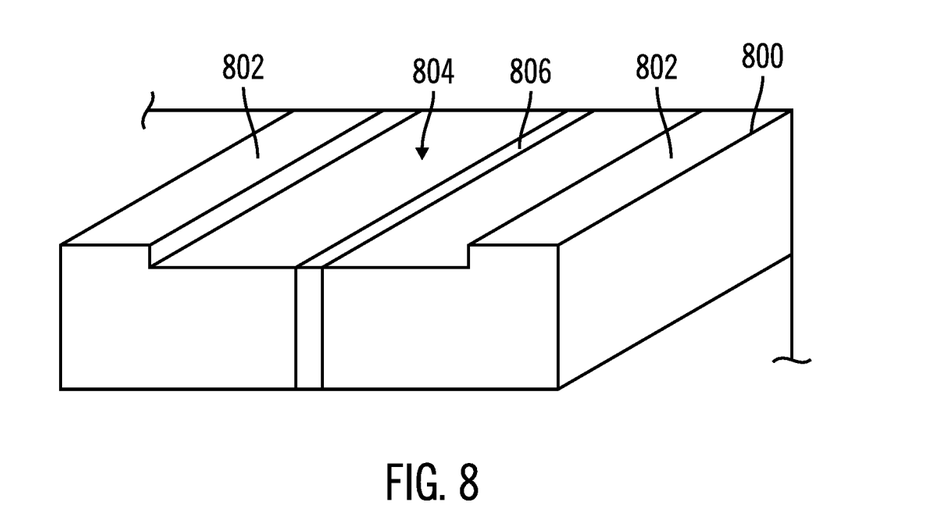
FIG. 8 illustrates an embodiment of a side of a module of the tape head.

FIG. 8 provides another perspective of the module 800, such as module 500 in FIG. 5, including tape bearing surface 802 with a recessed portion 804, where a gap 806 extends through the recessed portion 804, such as the gap 308 in FIG. 3. The transducer array, such as array 510 shown in FIG. 5 between the recessed portions 504, 506, would be located in the gap 806 on the tape bearing surface 802 after the recessed portion 804.

Described embodiments provide tape head modules with recessed portions formed on each side of the transducer array elements to allow air to flow into the module to form an air bearing between the tape medium and the non-functional regions of the tape bearing surface. Further, with described embodiments, the edges of the module are retained to allow for skiving of debris from the tape medium as the tape traverses the modules.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A tape head for performing read and/or write operations with respect to a tape medium traversing across the tape head, comprising:
  a module comprising:
    a tape bearing surface including a first edge and a second edge;

an array of transducers, including read and/or write transducers, on the tape bearing surface between the first edge and the second edge, so that the tape medium traversing across the tape head traverses across the first edge, the array of transducers, and the second edge; and a recessed portion formed on the tape bearing surface between the first edge and the second edge, the recessed portion spaced apart from the first edge and spaced apart from the second edge, the recessed portion including a variable depth relative to a plane extending through the first edge and the second edge of the tape bearing surface.

2. The tape head of claim 1, wherein the recessed portion comprises a first recessed portion, the tape head further comprising a second recessed portion, wherein the array of transducers is located on the tape bearing surface between the first recessed portion and the second recessed portion.

3. The tape head of claim 2, further comprising additional modules, wherein each of the additional modules include a first recessed portion and a second recessed portion formed on the tape bearing surface with an array of transducers located on the tape bearing surface between the first and second recessed portions.

4. The tape head of claim 2, wherein the module includes a first side and a second side, wherein the array of transducers is positioned on the tape bearing surface between the first side and the second side, wherein the first recessed portion extends to the first side, and wherein the second recessed portion extends to the second side.

5. The tape head of claim 4, wherein the module is configured so that the tape medium travels parallel with respect to the first side and the second side.

6. The tape head of claim 2, wherein the module includes a first side and a second side, wherein the array of transducers is positioned on the tape bearing surface between the first side and the second side, and wherein the recessed portion is spaced apart from first side and from the second side.

7. The tape head of claim 2, wherein the first recessed portion is defined in part by a bottom surface that is curved in a region adjacent to the array of transducers.

8. The tape head of claim 2, wherein at least part of the first recessed portion includes a depth that increases as a distance away from the transducer array section increases.

9. The tape head of claim 2, wherein the first recessed portion is spaced apart from the first edge by a first width and spaced apart from the second edge by a second width, wherein the first recessed portion defines a third width, wherein the third width is greater than the first width, and wherein the third width is greater than the second width.

10. The tape head of claim 1, the recessed portion defined in part by a bottom surface that is curved.

11. A tape head for performing read and/or write operations with respect to a tape medium traversing across the tape head, comprising:
a module comprising:
a tape bearing surface including a first edge and a second edge;
an array of transducers, including read and/or write transducers, on the tape bearing surface between the first edge and the second edge, so that the tape medium traversing across the tape head traverses across the first edge, the array of transducers, and the second edge; and
a first recessed portion and a second recess portion formed on the tape bearing surface between the first edge and the second edge, the first recessed portion and the second recessed portion spaced apart from the first edge and spaced apart from the second edge, the array of transducers located on the tape bearing surface between the first recessed portion and the second recessed portion;
wherein the module includes a second surface opposite the tape bearing surface, wherein the first recessed portion comprises a first aperture extending through the tape bearing surface to the second surface, and wherein the second recessed portion includes a second aperture extending through the tape bearing surface to the second surface.

12. The tape head of claim 11, wherein the module includes a first side and a second side, wherein the array of transducers is positioned on the tape bearing surface between the first side and the second side, wherein the first aperture extends to the first side, and wherein the second aperture extends to the second side.

13. The tape head of claim 11, further comprising additional modules, wherein each of the additional modules include a first recessed portion and a second recessed portion formed on the tape bearing surface with an array of transducers located on the tape bearing surface between the first and second recessed portions.

14. A tape drive for performing read and/or write operations with respect to a tape medium, comprising:
a motor;
guides for moving the tape medium driven by the motor;
a tape head, wherein the guides guide the tape medium across the tape head, comprising:
at least one module comprising:
a tape bearing surface including a first edge and a second edge;
an array of transducers, including read and/or write transducers, on the tape bearing surface between the first edge and the second edge, so that the tape medium traversing across the tape head traverses across the first edge, the array of transducers, and the second edge; and
a recessed portion formed on the tape bearing surface between the first edge and the second edge, the recessed portion spaced apart from the first edge and spaced apart from the second edge, the recessed portion including a variable depth relative to a plane extending through the first edge and the second edge of the tape bearing surface.

15. The tape drive of claim 14, wherein the recessed portion comprises a first recessed portion, the tape head further comprising a second recessed portion, wherein the array of transducers is located on the tape bearing surface between the first recessed portion and the second recessed portion.

16. The tape drive of claim 15, further comprising additional modules, wherein each of the additional modules include a first recessed portion and a second recessed portion formed on the tape bearing surface with an array of transducers located on the tape bearing surface between the first and second recessed portions.

17. The tape drive of claim 15, wherein the module includes a first side and a second side, wherein the first recessed portion extends to the first side and the second recessed portion extends to the second side.

18. The tape drive of claim 17, wherein the module is configured so that the tape medium travels parallel with respect to the first side and the second side.

19. The tape drive of claim 15, wherein at least part of the first recessed portion includes a depth that increases as a distance away from the transducer array section increases.

20. The tape drive of claim 14, the recessed portion defined in part by a bottom surface that is curved.

* * * * *